United States Patent [19]

Tan

[11] Patent Number: 4,833,821

[45] Date of Patent: May 30, 1989

[54] MUSHROOM CULTIVATION

[75] Inventor: Kok-Kheng Tan, Singapore, Singapore

[73] Assignee: Everbloom Biotechnology Ltd., Singapore, Singapore

[21] Appl. No.: 57,335

[22] Filed: Jun. 2, 1987

[30] Foreign Application Priority Data

Jun. 3, 1986 [GB] United Kingdom ............... 8613360
Jun. 3, 1986 [GB] United Kingdom ............... 8613362

[51] Int. Cl.$^4$ .................................................. A01G 1/04
[52] U.S. Cl. ........................................................ 47/1.1
[58] Field of Search ............................................. 47/1.1

[56] References Cited

U.S. PATENT DOCUMENTS

| | | | |
|---|---|---|---|
| 3,940,883 | 3/1976 | Kasahara et al. | 47/1.1 |
| 4,071,973 | 2/1978 | Iizuka et al. | 47/1.1 |
| 4,637,163 | 1/1987 | Pellinen et al. | 47/1.1 |
| 4,646,466 | 3/1987 | Olah | 47/1.1 |
| 4,674,228 | 6/1987 | Murata et al. | 47/1.1 |

FOREIGN PATENT DOCUMENTS

| | | | |
|---|---|---|---|
| 2750009 | 11/1976 | Fed. Rep. of Germany | 47/1.1 |
| 45-9803 | 4/1970 | Japan | 47/1.1 |
| 47-38992 | 10/1972 | Japan | 47/1.1 |
| 47-39026 | 10/1972 | Japan | 47/1.1 |
| 50-39012 | 12/1975 | Japan | 47/1.1 |

OTHER PUBLICATIONS

Sen Antonio, J. P. "Cultivation of Shiitake Mushroom", HortScience, vol. 16(2), Apr. 1981, pp. 151–156.

Primary Examiner—James R. Feyrer
Attorney, Agent, or Firm—Jones, Askew & Lunsford

[57] ABSTRACT

A method of cultivating wood-decaying edible fungi, which comprises hydrating and sterilizing comminuted wood, inoculating the thus-treated spawn of the fungi, and exposing the inoculated wood to conditions under which the spawn will grow and fruit.

3 Claims, No Drawings

MUSHROOM CULTIVATION

FIELD OF THE INVENTION

Many mushrooms are now cultivated intensively as opposed to being allowed to grow under reasonably wild conditions. This invention relates to the cultivation of mushrooms, particularly white rot fungi.

BACKGROUND OF THE INVENTION

White rot fungi are wood-decaying fungi which grow on a ligno-cellulose base as opposed to coprophilous fungi, for example, the Champignon mushroom, which grow by decomposing dung or compost. Examples of edible wood-rotting fungi include the abalone or oyster mushrooms such as *Pleurotus cystidiosus* (*P. abalonus*), *P. ostreatus* (both grey and white types), *P. cornucopia, P. sajor caju* and also the Shiitake or Chinese black forest mushroom known by the botanical name of *Lentinus edodes*. Of these, the Shiitake mushroom is the most difficult to grow because it grows only on wood whereas the other mushrooms will grow on almost any sort of cellulose base such as cotton waste or straw. The Shiitake mushroom apparently requires lignin as well as cellulose as a base for growth.

The traditional manner of cultivating Shiitake mushrooms is by the inoculation of wooden blocks with spawn. The blocks are left for many months to enable the spawn to grow through the block, after which fruiting occurs. Cultivation is chancy, and yield and time to fruiting are not particularly satisfactory.

The blocks of wood used for this type of cultivation are temperate hardwoods, such as beech and oak, of the *Fagaceae* family which are readily available in countries in Northern Europe and in Japan.

PRIOR ART

U.S. Pat. No. 1,833,089 discloses cultivating mushroom spawn on a substrate comprising sawdust and bran which is heat-sterilised and cooled before addition of the spawn.

U.S. Pat. No. 4,127,965 discloses cultivating Shiitake and other mushrooms on a substrate comprising cellulosic material, preferably in tree log form, and nutrients.

Ando, Proc. Ninth Int. Sci. Congress on the Cultivation of Edible Fungi, Tokyo 1974, pages 415–421, discloses using a variety of media for growing Shiitake mushrooms. Artificial media gave fruit-body formation in about 40 days, and sawdust media (of *Castanopsis cuspidata* or *Fagus crenata*) in about 70 days.

EP-A-0107911 describes swelling cereal grain in water, sterilising the grain, inoculating the sterile grain with a mushroom culture, and incubating the inoculated grain.

SUMMARY OF THE INVENTION

According to one aspect of the present invention, it has been found that wood from the rubber tree *Hevea brasiliensis* forms a good base on which to cultivate Shiitake mushrooms.

It has also been found that such mushrooms can be intensively cultivated by growing the fungi on green or untreated wood which has been comminuted into small chips or sawdust having particle size of generally from 1 mm to 3 mm. In general terms, suitable woods include the temperate hard-woods such as *Lithocarpus, Castanopsis, Quercus sp* and other members of the *Fagaceae* family.

A further discovery has been that mushroom fruiting can be induced at a particular stage of the growth cycle.

DESCRIPTION OF THE INVENTION

The invention is not necessarily limited to growing Shiitake mushrooms, since other wood-decaying fungi can also use rubber tree wood as a base for growth. However, such other fungi tend to be less demanding and specific than the Shiitake mushroom; for example, oyster and abalone mushrooms can be cultivated intensively on cotton wastes or chopped straw.

An important advantage of the ability to use *Hevea brasiliensis* wood is that, in tropical regions, rubber trees are widely available as a waste product. Thus, at present, there is a trend towards rooting out excess rubber trees which are normally then burnt. The very substantial reserves of rubber tree plantations in S.E. Asia at least means that there is always likely to be available a substantial source of rubber tree wood. The invention puts this waste product to use.

The comminuted wood used in the invention is hydrated to about 60–70% by weight, and is then sterilised or pasteurised to killoff any unwanted spores. More than one sterilisation or pasteurisation step may be appropriate, there being a period between consecutive sterilisations or pasteurisations, to enable any viable spore contaminants to germinate. The method and conditions of sterilisation or pasteurisation will depend upon the likely contamination of the initial wood and the spore content of the surrounding environment.

Before or after sterilisation or pasteurisation, and before or after cooling and the addition of mushroom spawn, the substrate is conveniently filled into one or more containers such as trays, shelves or bags of any suitable size. For example, the substrate can also be used to fill plastics material bags, e.g. polypropylene bags which are about 90–105 mm in diameter and compressed to a height of about 150 to 210 mm. The bags are stoppered with a foam plug which can withstand autoclaving temperatures and steam sterilisation, e.g. for 1 to 2 hours at 121° C. or more generally up to 140° C.

The sterilised or pasteurised substrate, e.g. in bags, is then mixed or inoculated with spawn, e.g. prepared as described in EP-A-0107911. The bags are left to allow the substrate to be fully colonised by the spawn before fruiting. It may, for example, take up to 8 weeks to enable the spawn to penetrate fully throughout the mass of the substrate. If the mixture is in bags, the tops of the bags are then opened. Buds appear within a week and, within a further few days, the resulting mushroom fruit is ready for cropping.

It has been found that, by such a process, high yields of mushrooms can be achieved in relatively short times as compared with the time required when the mushrooms are grown on solid logs of oak.

It has been found that, to promote growth of the mushrooms, it is also desirable to add a nutrient mix to the comminuted wood on which edible wood rotting fungi spawn is to be cultivated. The nutrient mix comprises a carbon source and any other components which facilitate growth, e.g. rice bran. Nutrients may be conventional; many are described in US-A-4127965.

Once the nutrient mix has been thoroughly mixed with the comminuted wood, the overall mixture must be wetted. Preferably water is added in a proportion of from 40 to 70% based on the overall weight of the original dry mix. Care should be taken, however, to avoid the addition of water in an amount which might cause the leaching out of many of the chemical nutrients from the overall mixture.

As indicated above, the resulting mixture is sterilised or pasteurised after hydration, to kill off unwanted spores which can compete with the desired mushroom growth. The sterilised or pasteurised substrate (comprising comminuted wood particles and optionally added nutrients) is inoculated with a spawn culture of the mushrooms e.g. spawn prepared as described in EP-A-0107911. A period of spawn-run is allowed to enable the spawn to colonise throughout the mixture followed by fruiting after which the mushrooms are ready for harvesting.

It is desirable in such intensive cultivation to have all the mushrooms in a particular growing area and for the mushrooms to fruit at about the same time so as to facilitate efficient cropping. To this end, after the spawn has been allowed to penetrate throughout the substrate, the substrate is subjected to mechanical or thermal shock to induce fruiting. At least part of the spawn-covered substrate is exposed to normal cropping condition of light and temperatures to allow fruiting bodies (mushrooms) to develop, after which the mature mushrooms are cropped. Again, the cropped substrate is subjected to thermal or mechanical shock to induce fruiting, followed by normal cropping conditions. The cycle may be carried out up to 6 to 8 times before the cellulose and lignin from the wood substrate are exhausted, making it incapable of supporting further cropping.

Mechanical induction of cropping involves movement or vibration of the substrate. Thermal induction can be achieved by subjecting the substrate to a temperature of 25–30° C. which is about the maximum temperature which will not result in destruction of the Shiitake fungus. The temperature does not exceed 30° C. and is preferably 28° C. The substrate is kept at this relatively high temperature for about 1 to 7 days to allow the fungus to rest, after which the temperature is reduced to about 5 to 15° C., e.g. 10° C., for generally 1 to 5 days. Such temperatures are relatively cold for growing but some growth does occur at these lower temperatures. The shock in the change from relatively high temperature to a low temperature induces efficient fruiting of the fungus. The temperature of the substrate is then raised to an optimum cropping temperature which is of the order of 20° C., for 7 to 10 days. Normal growth of the fungus is promoted by watering to maintain normal cropping conditions which involves keeping reasonable humidity and adequate lighting and ventilation conditions.

By repeating the cycle of induction and normal fruiting, fruiting can be induced at about the same time in a particular growing region and so the efficiency of picking can be high. Also, good yields of mushrooms are achieved and substantially all of the cellulose and lignin in the substrate on which the Shiitake fungus grows can be used up.

The following Example illustrates the invention.

EXAMPLE

One part by weight rice bran was mixed with 4 parts by weight of green sawdust from trees of the *Hevea brasiliensis* family. Water was added, to a degree of hydration of at least 60%. The resultant composition was filled into polypropylene bags and stoppered by a polypropylene collar and cap assembly which allowed exchange of air but prevented contamination. The composition was sterilised for 45 to 60 minutes in an autoclave at 140° C. by steam. When the sterilised composition was cool, mushroom spawn (*Lentinus edodes*) was added. The composition was then left, to allow colonisation for 6 to 10 weeks at 25° C.

After spawn-run, the fully-colonised composition was moved to a cropping house at 20° C. to allow mushrooms to develop. The tops of the polypropylene bags were removed, and mushroom buds appeared within a week. When the buds appeared, a further 3 to 4 days were required before the mushrooms were ready for harvesting. The whole cropping period required 15–20 weeks. Six flushes of mushrooms were harvested before the substrate was spent.

Mechanical or thermal shock could be used to induce cropping. Mechanical shock involved moving the spawn-run substrate. Thermal shock involved heating the spawn-run substrate to 28° C. for 4 days, cooling to 10° C. for 4 days, and heating to 20° C. for 10 days.

While the invention has been described in connection with certain embodiments, it is not intended to limit the scope of the invention to the particular form set forth, but on the contrary to cover such alternatives, modifications and equivalents as may be defined by the appended claims, and also by the following statement of invention, i.e. a method of cultivating wood-decaying edible fungi, which comprises mixing spawn of the fungi with a substrate comprising comminuted wood which has been hydrated and sterilised or pasteurised, and exposing the mixture to conditions under which the spawn will grow and fruit, wherein the wood is from a tree of the *Hevea brasiliensis* family.

What is claimed is:

1. A method of cultivating wood-decaying edible fungi, which comprises mixing spawn of the fungi with a substrate comprising comminuted wood from a tree of the *Hevea brasiliensis* specie which has been hydrated and rendered free of unwanted spores, exposing the mixture to conditions under which the spawn will colonize, and inducing fruiting by subjecting the spawn-run substrate to shock.

2. A method of cultivating wood-decaying edible fungi which comprises mixing spawn of the fungi with a substrate comprising comminuted wood wherein the wood is from a tree of the *Hevea brasiliensis specie* which has been hydrated and rendered free of unwanted spores, exposing the mixture to conditions under which the spawn will colonize, and inducing fruiting by subjecting the spawn-run substrate to thermal shock comprising sequentially raising, lowering and raising of the temperature to 25–30° C., 5–15° C. and 15–25° C., respectively.

3. A method of cultivating wood-decaying edible fungi, which comprises mixing spawn of the fungi with a substrate comprising comminuted wood from a tree of the *Hevea brasiliensis* specie which has been hydrated and rendered free of unwanted spores, exposing the mixture to conditions under which the spawn will colonize, and inducing fruiting by subjecting the spawn-run substrate to mechanical shock by physical movement.

* * * * *